United States Patent
Harris

(10) Patent No.: US 6,178,259 B1
(45) Date of Patent: *Jan. 23, 2001

(54) METHOD OF COMPENSATING FOR PIXEL HISTOGRAM DISTORTION IN AN OBJECT RECOGNITION SYSTEM

(75) Inventor: Craig Weaver Harris, Lake Forest, CA (US)

(73) Assignee: Unisys Corporation, Blue Bell, PA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/062,370

(22) Filed: Apr. 17, 1998

(51) Int. Cl.[7] .................................................. G06K 9/00
(52) U.S. Cl. ......................... 382/170; 382/118; 382/218; 382/298
(58) Field of Search ........................... 382/115–117, 170, 382/116, 218, 168, 209, 119, 298–299, 124

(56) References Cited

U.S. PATENT DOCUMENTS

| | | | |
|---|---|---|---|
| 4,651,199 | * 3/1987 | Alkofer | 358/80 |
| 4,959,870 | * 9/1990 | Tachikawa | 382/56 |
| 5,163,094 | * 11/1992 | Prokoski et al. | 382/2 |
| 5,497,430 | * 3/1996 | Sadovnik et al. | 382/156 |
| 5,693,940 | * 12/1997 | Botti et al. | 250/252.1 |
| 5,748,802 | * 5/1998 | Winkelman | 382/271 |
| 5,822,453 | * 10/1998 | Lee et al. | 382/169 |
| 5,835,616 | * 10/1998 | Lobo et al. | 382/118 |
| 5,991,429 | * 11/1999 | Coffin et al. | 382/118 |

* cited by examiner

Primary Examiner—Leo H. Boudreau
Assistant Examiner—Ishrat Sherali
(74) Attorney, Agent, or Firm—Charles J. Fassbender; Mark T. Starr; Rocco L. Adornato

(57) ABSTRACT

A method of recognizing an unknown object includes the following steps: receiving from a camera, a first image of the unknown object which is comprised of an array of pixels of multiple magnitudes that lie within a certain range; generating a second image from the first image by scaling the pixel magnitudes in the first image such that differences in the scaled pixel magnitudes are increased and the average pixel magnitude lies near the middle of the pixel range; and, determining the width of the unknown object by detecting an area in the second image where the pixel magnitudes exceed a certain threshold level. Based on that width, a third image is generated from the second image, by adjusting the magnification of the second image such that it has a predetermined standard width; and the unknown object is identified if a correlation between the third image and a reference exceeds a threshold.

11 Claims, 5 Drawing Sheets

EQ. 1 - $P2 = V_{SD}(P1 - V_A)$ IF $P1 > M$
ELSE, $P2 = 0$

EQ. 2 - $P2 = 1.5(P1 - 64)$ IF $P1.64$
ELSE, $P2 = 0$

EQ. 3 - $P2_A = 1.5(P1_A - 64)$

EQ. 4 - $P2_B = 1.5(P1_B - 64)$

EQ. 5 - $P2_A - P2_B = 1.5(P1_A - P1_B)$

EQ. 6 - $\Delta P2 = V_{SD} \Delta P1$

EQ. 7 - $P2 = V_{SD} P1$ IF $P1 < 255 + V_{SD}$
ELSE, $P2 = 255$

METHOD OF COMPENSATING FOR PIXEL HISTOGRAM DISTORTION IN AN OBJECT RECOGNITION SYSTEM

BACKGROUND OF THE INVENTION

This invention relates to object recognition systems; and more particularly, it relates to methods of compensating for pixel histogram distortion which can occur in such systems.

One particular use for the present invention is in object recognition systems which either grant or deny a person access to a secure area based on whether or not an image from a camera of the person's face is recognized by the system. Also, the present invention can be used in object recognition systems which employ a robotic arm to select or reject a component based on whether or not an image from a camera of the component is recognized by the system.

In all of the above applications, a key task which needs to be performed as part of the recognition process is that two images must be correlated. One of these images is the image, from a camera, of an unknown object which the system is trying to recognize; and the other image is of a known object which is stored in the system as a reference. If the correlation between the two images exceeds a predetermined threshold value, then the unknown object is recognized.

However before the two images are correlated, it is highly desirable to adjust the magnification of the image of the unknown object such that it is closely matches the magnification of the reference. This is because as the difference in magnification of the unknown object and the reference increases, their correlation decreases; and that will cause recognition errors.

In the case where a person is seeking access to a secure area, the magnification of that person's image from the camera will increase as the person stands closer to the camera, and vice-versa. Such variations in magnification will occur in a work environment because it is not practical for a person to stand exactly the same distance from the camera each time access is sought.

Before any adjustment in magnification is made to the image of the unknown object, the current magnification of that object must be detected. This can be attempted by sensing the width of the unknown object in the image from the camera and comparing it to the width of the reference.

However, the present inventor has found that under certain conditions, a histogram of the pixels in the image from the camera can be distorted in a particular fashion which causes errors to occur when the width of the unknown object is sensed. If that happens, the magnification of the image from the camera will be adjusted incorrectly, and thus a recognition error will occur.

Accordingly, a primary object of the present invention is to provide an object recognition system in which the above problem is overcome.

BRIEF SUMMARY OF THE INVENTION

With the present invention, the above problem is overcome as follows. Initially, a first image of the object that is to be recognized is received from a camera. Then, a second image is generated from the first image, by scaling the pixel magnitudes in the first image such that a histogram of the pixels in the second image has a larger standard deviation than a histogram of the pixels in the first image. Next, the width of the unknown object is detected as the width of an area in the second image where the pixel magnitudes exceed a certain minimum. Then, a third image is generated from the second image, by adjusting the magnification of the second image based on the detected width; and the unknown object is identified if a correlation between the third image and a reference exceeds a threshold.

One particular embodiment of the present invention recognizes the face of a person who is seeking access to a secure area, and an infrared camera is used to generate an image of that person. However, as the person's face becomes hotter, then a histogram of the pixels in the facial image from the infrared camera will become shifted to the high side of the pixel temperature spectrum and the standard deviation of the pixels will decrease. Such facial heating can occur, for example, if the person recently was exercising or was outside in hot weather.

As the standard deviation of the pixels from the camera decrease, a point is eventually reached where the width of the person's face cannot be accurately detected. This occurs because as the standard deviation decreases, any difference in the magnitude of the pixels in the person's hair and the person's skin tends to decrease. Thus, long hair on the sides of the becomes indistinguishable from skin on the face.

BRIEF DESCRIPTION OF THE DRAWINGS

FIG. 6 shows a set of equations which explain why the width of the face in FIG. 5 is detected more accurately from the second image that is generated by the process of FIG. 3, in comparison to the first image.

DETAILED DESCRIPTION

Figure 1:
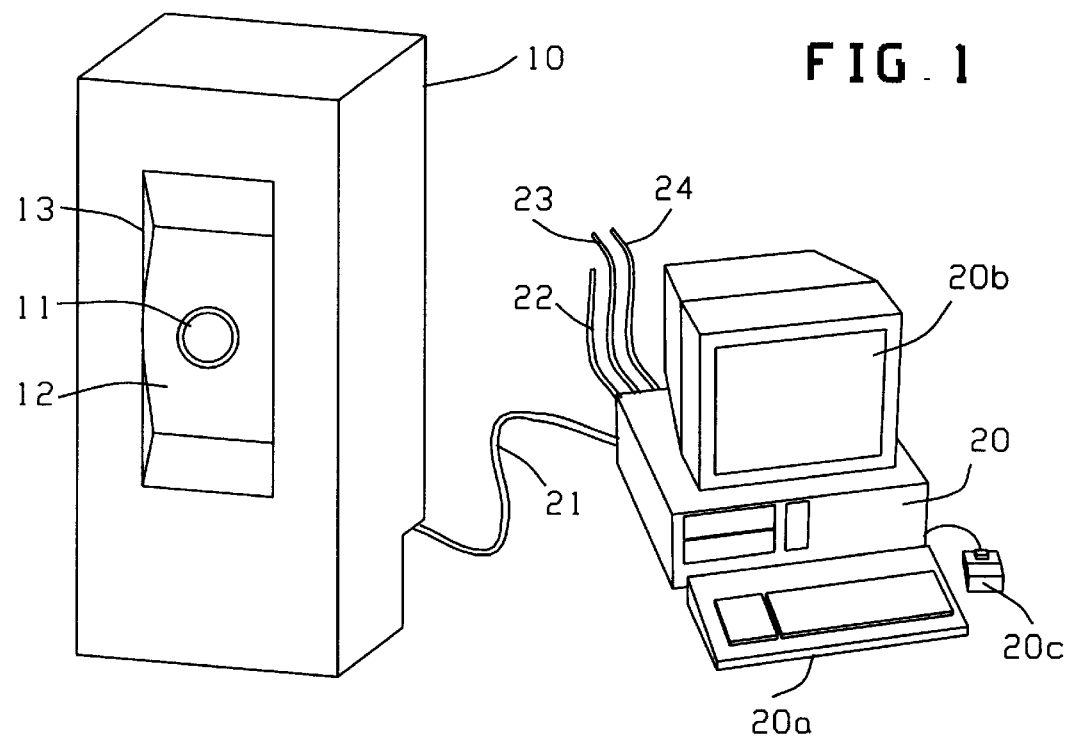
FIG. 1 shows a three-dimensional external view of an object recognition system which processes images via the present invention.

Referring now to FIG. 1, it shows an object recognition system that recognizes objects via a process which constitutes the present invention. This FIG. 1 system includes an electromechanical apparatus 10 and a computer 20 which are intercoupled by a cable 21. Inside of the apparatus 10 is an infrared camera 11 and a carrier 12 for the camera. Only the lens of the camera 11 and a small portion of the carrier 12 can be seen through a window 13 in the apparatus 10.

Extending from the back of the computer 20 are four electrical cables 21, 22, 23 and 24. Cable 21 provides a communication channel between the computer 20, the camera 11, and the carrier 12. Cable 22 is a cable on which the computer 20 receives electrical signals from a card reader that represent the personal identification number (PIN) of a person who is seeking access to a secure area. Cable 23 is a cable on which the computer 20 sends electrical signals which unlock a door to the secure area. Cable 24 is a power cable which supplies electrical power to the computer 20.

Figure 2:
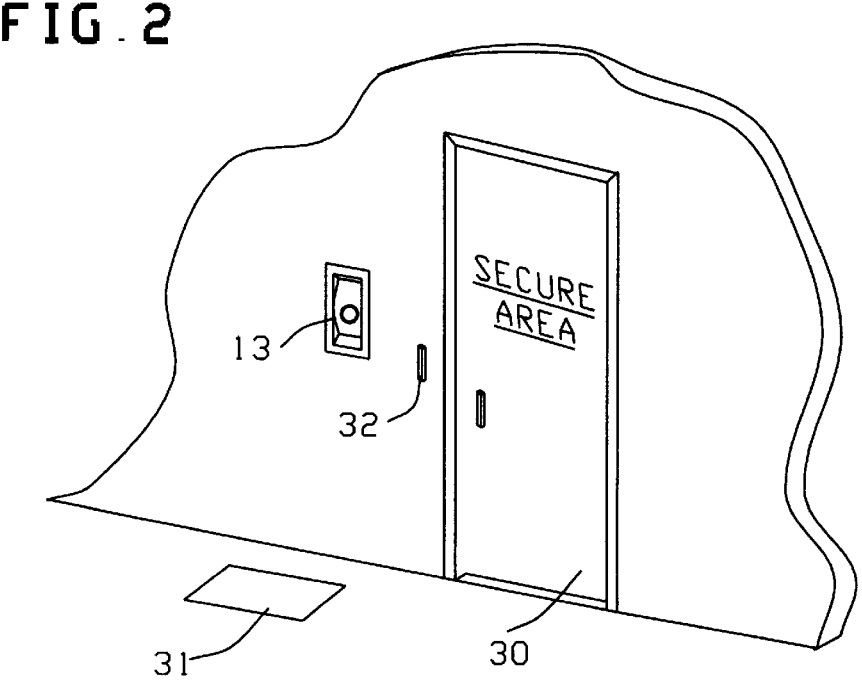
FIG. 2 shows an example where the object recognition system of FIG. 1 is used to either grant or deny a person access to a secure area.

An example of how the FIG. 1 object recognition system is used is shown in FIG. 2. There, reference numeral 30 identifies the door to the secure area. In order to be granted access to the secure area, a person X must first be enrolled in the object recognition system. During this enrollment, the person X stands near a spot 31 and looks through the window 13 at the camera 11 while an operator of the computer 20 manually enters commands via the keyboard 20a.

Initially by these commands, the camera 11 is moved on the carrier 12 to various angles which the operator selects; and an image from the camera is displayed on the computer monitor 20b. One of these angles is then picked by the operator as the angle where the camera lens is pointing directly at the face of the person X.

Then the operator enters other commands via the keyboard 20a which increase/decrease the magnification of the image on the monitor 20b until the face has a predetermined standard width. This image, called the enrollment image, is then stored within the computer 20 along with the PIN of the person X and the camera angle. For each person X who is to be granted access to the secure area, this enrollment is repeated.

Figure 3:
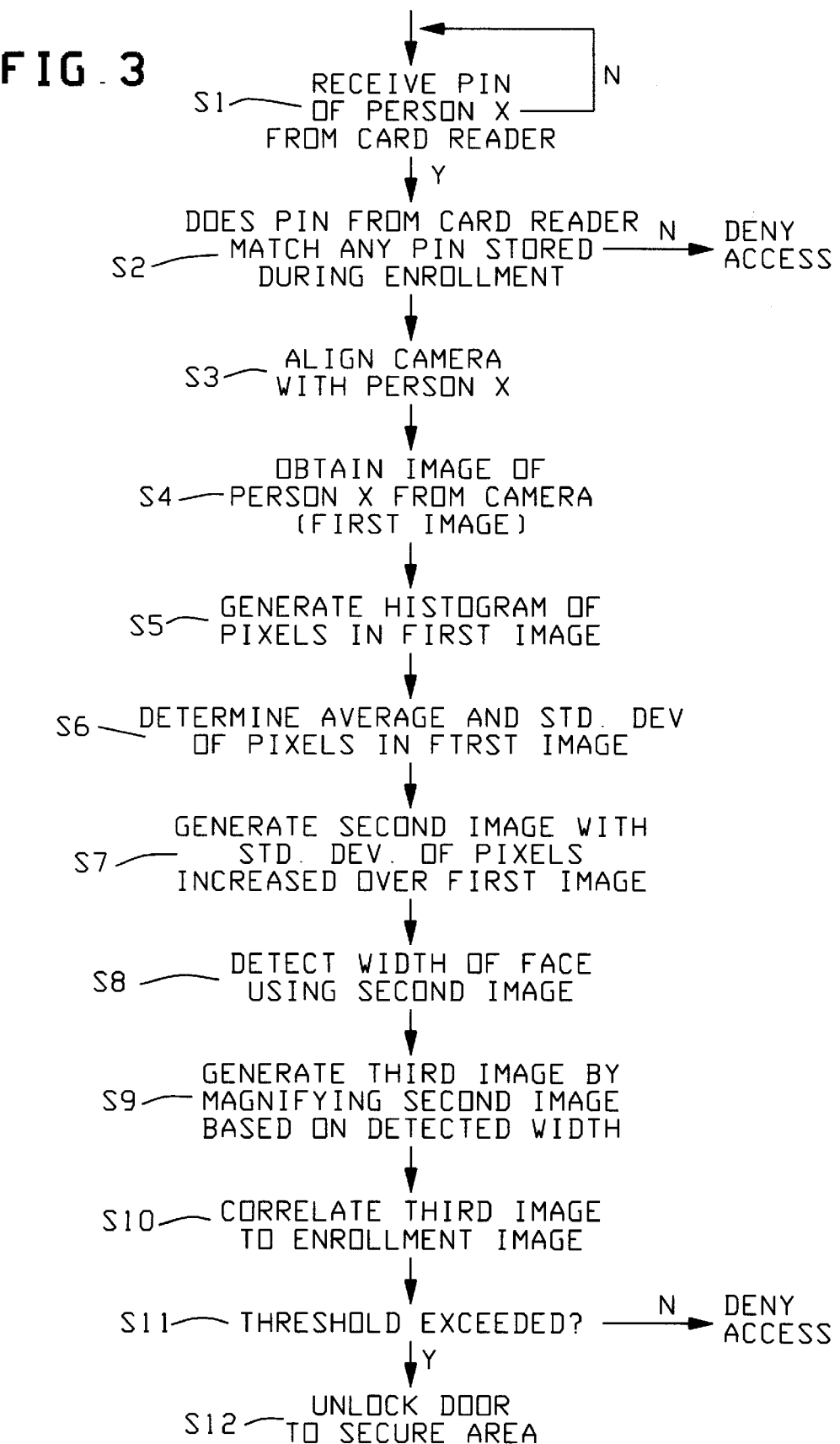
FIG. 3 shows a process which the FIG. 1 system performs to recognize objects while compensating for pixel histogram distortion, in accordance with the present invention.

After a person X is enrolled, the computer 20 performs a novel recognition process, as shown in FIG. 3, each time that person X seeks access to the secure area. Initially in the FIG. 3 process, the person X stands near the spot 31, looks at the window 13, and passes a magnetic stripe on his personal identification card through a card reader 32. This occurs as step S1 in FIG. 3, and it causes the PIN of the person X to be sent from the card reader 32 to the computer 20.

Next, the computer 20 checks to see if the PIN which it received in step S1 matches one of the PIN's which it previously stored during the enrollment process. This occurs as step S2. If a match is found, then the computer 20 performs step S3 where it sends control signals to the apparatus 10 which cause the camera 11 to be pointed at the angle which was stored during enrollment with the received PIN.

Next, the computer 20 performs step S4 where it receives an image from the camera 11 of the face of the person X who is seeking access to the secure area. This image is here referred to as the first image. Then the computer 20 performs step S5 in which it generates a histogram of the pixels in the first image. An example of this histogram is shown in FIG. 4 where it is identified by reference numeral 40.

Figure 4:
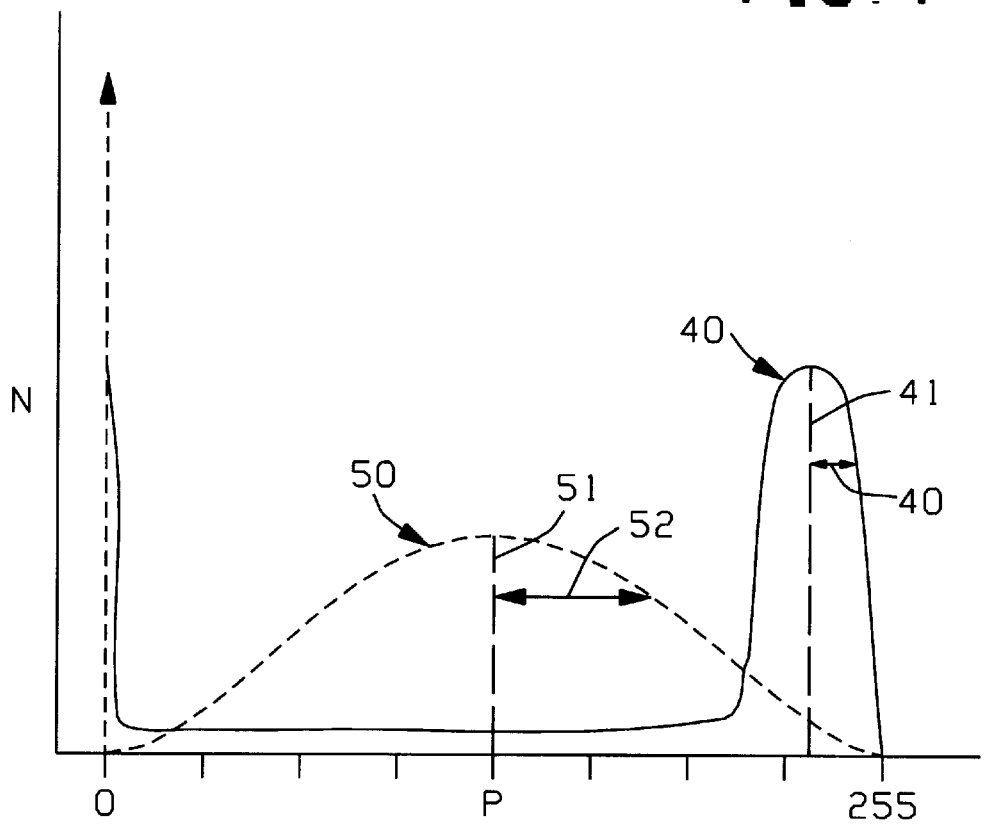
FIG. 4 shows an example of a pixel histogram of a first image, and a pixel histogram of a second image, which are generated in the process of FIG. 3.

This histogram 40 in FIG. 4 relates the variable P (pixel magnitude) to the variable N (the number of times which a pixel of magnitude P occurs in an image). In FIG. 4, the pixel magnitude P ranges from 0 to 255 as an example in which each pixel is an 8-bit pixel.

Next, the computer 20 determines the average magnitude of the pixels in the first image histogram, and it determines the standard deviation of the pixels in that histogram. This occurs as step S6. In FIG. 4, the average value is indicated by reference numeral 41 and the standard deviation is indicated by reference numeral 42.

Then, using the average value 41 and standard deviation 42, the computer 20 generates a second image from the first image by scaling the pixel magnitudes in the first image such that a histogram of the pixels in the second image has a larger standard deviation than a histogram of the pixels in the first image. This occurs as step S7.

An example of the histogram of the pixels in the second image is shown in FIG. 4 where it is indicated by reference numeral 50. All of the pixels in the second image have an average value which is indicated in FIG. 4 by reference numeral 51, and they have a standard deviation which is indicated by reference numeral 52.

Next, the computer 20 examines the pixels in the second image that was generated by step S7 to detect the width of the person's face who is seeking access to the secure area. This step which is shown as step S8, can be performed by detecting the width of an area in the second image where the pixel magnitudes exceed a certain minimum. Then the computer 20 performs step S9 which generates a third image by magnifying the second image based upon the width which was detected in step S8. Here, the magnification factor is set equal to the predetermined standard width of the face in the enrollment image divided by the width of the face which is detected in step S8.

Next, the computer 20 performs step S10 which correlates the third image to the enrollment image that corresponds to the PIN that was received from the card reader in step S1. Then, the computer 20 performs steps S1 and S12 by which it unlocks the door 30 to the secure area only if the correlation in step S10 exceeds a predetermined threshold.

An important novel feature of the FIG. 3 process occurs in step S7 where the second image is generated such that its pixels have a larger standard deviation than the pixels in the first image. Why this step S7 is important will now be explained.

Inspection of FIG. 4 shows that the average magnitude 41 of the pixels in the first image is near the high end of the pixel range. This high average magnitude 41 will occur, for example, if the person X who is seeking access to the secure area was recently exercising, or was recently outside in hot weather.

As the average pixel magnitude in an image increases toward the high end of the pixel range, the magnitudes of all of the pixels tend to become grouped more closely together; and this is indicated in FIG. 4 by the small standard deviation 42. However, a small standard deviation can be detrimental because as the standard deviation decreases, a point is eventually reached where the width of the person's face cannot be accurately detected.

This width detection problem occurs because as the standard deviation decreases, the difference in the magnitude of the pixels in the person's hair and the person's skin tends to decrease. Thus, any long hair along the sides of the face becomes indistinguishable from skin on the face.

By comparison, inspection of FIG. 4 shows that the average magnitude 51 of the pixels in the second image is near the middle of the pixel range of 0 to 255; and further, the standard deviation 52 of the pixels in the second image is much larger than the standard deviation 42. Consequently, long hair along the sides of the face in the second image is easily distinguishable from skin on the face; and thus, the width of the face in the second image can be detected accurately.

Figure 5:
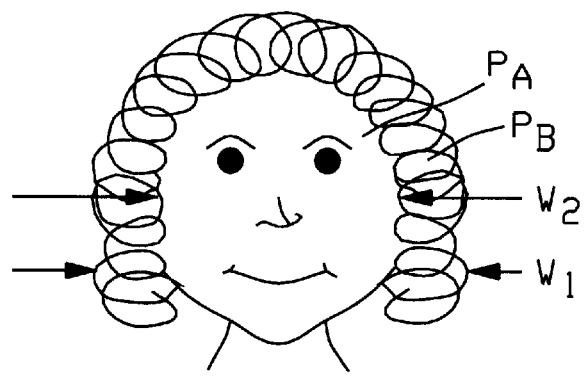
FIG. 5 shows an example of a face whose width is being detected by the process steps of FIG. 3.

An example of the above is illustrated in FIG. 5 where the image of the face of a person X is shown who has long hair. One pixel on the skin of the face in FIG. 5 is indicated as $P_A$, and one pixel on the hair by the face is indicated as $P_B$. If the FIG. 5 image has the histogram 40 as shown in FIG. 4, then the pixels $P_A$ and $P_B$ will have a relatively small difference in magnitude. Thus, the hair in FIG. 5 is difficult to distinguish from the person's skin, and so the width of the face in FIG. 5 can be erroneously determined to be $W_1$ as shown.

By comparison, if the FIG. 5 image has the histogram 50 as shown in FIG. 4, then the pixels $P_A$ and $P_B$ will have a relatively large difference in magnitude. Thus, the hair in FIG. 5 is easy to distinguish from the skin, and so the width of the face in FIG. 5 will be correctly determined to be $W_2$ as shown.

Preferably, the scaling which is used to generate the pixels in the second image is performed as follows: $P2=V_{SD}(P1-V_A)$ if P1 is greater than a predetermined minimum M, otherwise P2=0. This is stated by equation 1 in FIG. 6. In equation 1, P1 is any pixel in the first image; P2 is the corresponding pixel in the second image; $V_S$ is a parameter greater than one which increases as the standard deviation 42 of the first image decreases; and $V_A$ is a parameter greater or equal to zero which increases as the average value 41 of the first image increases.

A numerical example of the above scaling is the case where M=64, $V_{SD}$=1.5, and $V_A$=64. This example is stated by equation 2 in FIG. 6. When equation 61 is used to scale the pixels $P_A$ and $P_B$ in FIG. 5, the result is given by equations 3 and 4 in FIG. 6.

To determine the difference in the magnitude of the pixels $P_A$ and $P_B$, equation 4 need only be subtracted from equation 3. This subtraction is given by equation 5 in FIG. 6. From equation 5, it is seen that the pixels $P_A$ and $P_B$ differ in the second image by an amount which is 50% larger than their difference in the first image. Consequently, the width of the face in the second image will be detected more accurately than the width of the face in the first image.

Equation 6 of FIG. 6 expresses $\Delta P2$ in more general terms, where $\Delta P2$ is the difference in the magnitude of any two pixels in the second image. In equation 6, the term $V_{SD}$ is as defined above, and $\Delta P1$ is the difference in magnitude of the two pixels in the first image which correspond to the two pixels in the second image that yield $\Delta P2$. By restricting the parameter $V_{SD}$ to be greater than one, the difference $\Delta P2$ will always exceed the difference $\Delta P1$.

A preferred process for recognizing objects in accordance with the present invention has now been described in detail. In addition, however, various modifications can be made to this process, which will now be described.

Figure 7:
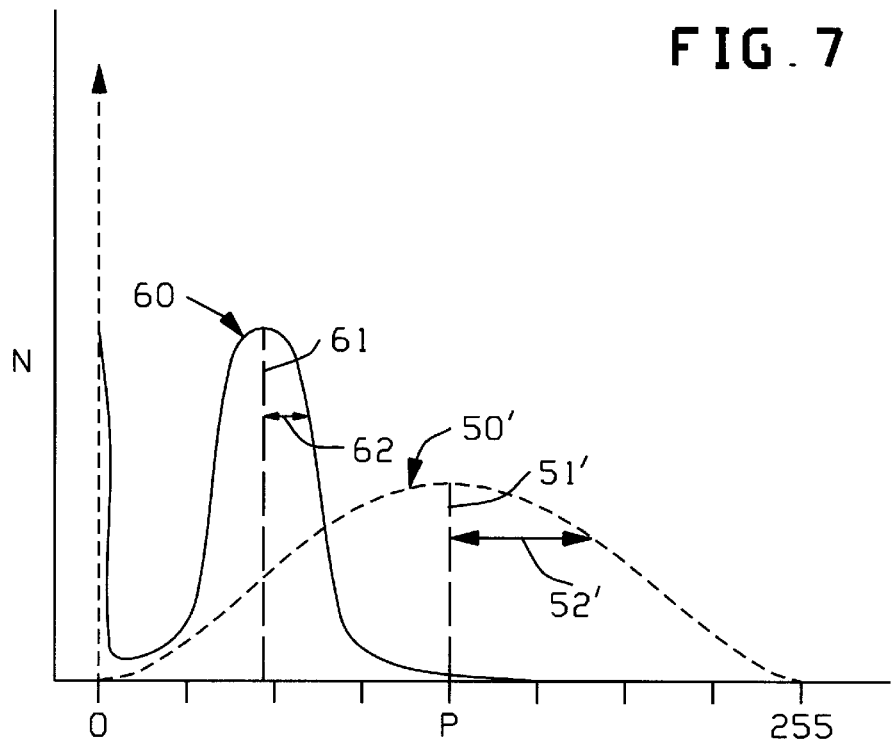
FIG. 7 shows another example of a pixel histogram of a first image, and a pixel histogram of a second image, which are generated in the process of FIG. 3.

One modification is shown in FIG. 7. There, reference numeral 60 identifies another example of a histogram of the pixels in the first image which is received from the camera 12 in step S4 of FIG. 3. This histogram 60 will occur if the person X who is seeking access to the secure area was recently exposed to cold weather.

In the histogram 60, the average pixel magnitude is indicated by reference numeral 61, and the standard deviation is indicated by reference numeral 62. Inspection of FIG. 7 shows that the average pixel magnitude 61 is near the low end of the pixel range of 0 to 255.

As the average pixel magnitude in an image decreases toward the low end of the pixel range, the magnitudes of all of the pixels tend to become grouped more closely together; and this is indicated in FIG. 7 by the small standard deviation 62. Here again, a small standard deviation can be detrimental because as the standard deviation decreases, a point is eventually reached where the width of the person's face cannot be accurately detected.

By comparison in accordance with the present invention, the computer 20 generates a second image from the first image by scaling the pixel magnitudes in the first image such that a histogram of the pixels in the second image has a larger standard deviation than a histogram of the pixels in the first image. This occurs as step S7 of FIG. 3.

In FIG. 7, the histogram of the pixels in the second image is indicated by reference numeral 50' because it is very similar to the histogram 50 of the second image which is shown in FIG. 4. Also, the average pixel magnitude in the histogram 50' is indicated by reference numeral 51'; and the standard deviation is indicated by reference numeral 52'.

Preferably, the scaling which is used generate the pixels in the second image in FIG. 7 is performed by equation 7 in FIG. 6. As one numerical example, the parameter in equation 7 can have the following value: $V_{SD}$=1.5.

Figure 8:
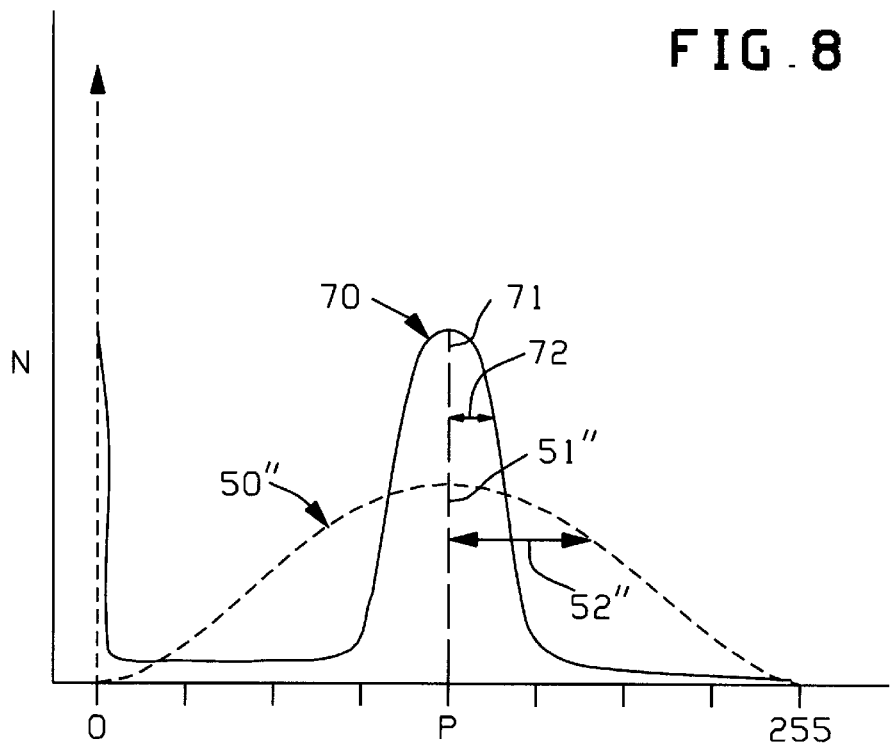
FIG. 8 shows still another example of a pixel histogram of a first image, and pixel histogram of a second image, which are generated in the process of FIG. 3.

Another modification is shown in FIG. 8. There, reference numeral 70 identifies a third example of a histogram of the pixels in the first image which is received form the camera 12 in step S4 of FIG. 3. This histogram 70 will occur if the temperatures across the face of the person X who is seeking access to the secure area have just a small amount of variation.

In the histogram 70, the average pixel magnitude is indicated by reference numeral 71, and the standard deviation is indicated by reference numeral 72. FIG. 8 shows that the average pixel magnitude 71 is near the middle of pixel range of 0 to 255; but, the standard deviation 72 of pixels is still small.

This standard deviation 72 decreases as the temperatures across the face of the person X become more uniform. Such uniformity is caused by the particular physiology of the person X, such as the pattern of blood vessels in the person's face. Here again, a small standard deviation can be detrimental because as the standard deviation decreases, a point is eventually reached where the width of the person's face cannot be accurately detected.

By comparison in accordance with the present invention, the computer 20 generates a second image from the first image by scaling the pixel magnitudes in the first image such that a histogram of the pixels in the second image has a larger standard deviation than a histogram of the pixels in the first image. This occurs as step S7 of FIG. 3.

In FIG. 8, the histogram of the pixels in the second image is indicated by reference numeral 50" because it again is similar to the histogram 50 of the second image which is shown in FIG. 4. Also, the average pixel magnitude in the histogram 50" is indicated by reference numeral 51"; and the standard deviation is indicated by reference numeral 52".

Preferably, the scaling which is used generate the pixels in the second image in FIG. 8 is performed by equation 8 in FIG. 6. As one numerical example, the parameters in equation 8 can have the following values: $V_{SD}$=1.5, $V_A$=64.

As still another modification, the steps S4–S9 which occur in the FIG. 3 recognition process can be incorporated into the process for enrolling the person X. With this modification, the person X is enrolled as follows.

Initially, the person X stands near the spot 31 as previously described in conjunction with FIG. 2; and the person X looks through the window 13 at the camera 11 while an operator of the computer 20 manually enters commands via the keyboard 20a. By these commands, the camera 11 is moved on the carrier 12 to various angles which the operator selects; and an image from the camera is displayed on the computer monitor 20b. One of these angles is then picked by the operator as the angle where the camera lens is pointing directly at the face of the person X.

Next, the operator enters other commands via the keyboard 20a which cause the computer 20 to perform the steps S4–S9 of FIG. 3. Then, the third image which is generated by step S9 is stored within the computer 20, as the enrollment image, along with the PIN of the person X and the camera angle.

As another modification, the camera 11 which is included in the FIG. 1 object recognition system, need not be an infrared camera. Instead, the camera 11 can be one which generates the first image as an array of pixels in which each pixel represents various physical phenomena. For example, the camera 11 can generate a visible light image, or an ultraviolet light image, or a sonar image.

An another modification, the object which the FIG. 1 system recognizes need not be the face of a person. Instead, the object which the FIG. 1 system recognizes can be any object whose image can be captured by the camera 11.

As another modification, the step of magnifying the second image, which occurs as step S9 in FIG. 3, can be performed in any manner that is suitable for a digital computer. For example, several suitable methods are described in U.S. patent application Ser. No. 09/008,217 by the present inventor, filed Jan. 16, 1998, entitled "Method of Generating a Scaled Replica of a Digital Input Image by Distorting the Spacing of the Pixels in the Input Image."

Accordingly, it is to be understood that the present invention is not limited to the details of just the illustrated preferred process but is defined by the appended claims.

What is claimed is:

1. A method of recognizing an unknown object, including the steps of:

receiving from a camera, a first image of said unknown object which is comprised of an array of pixels of several different magnitudes;

generating a second image, after said first image is received, by scaling the pixel magnitudes in said first image such that a histogram of the pixels in said second image has a larger standard deviation than a histogram of the pixels in said first image;

detecting an area in said second image where the pixel magnitudes exceed a certain minimum;

generating a third image, after said second image is generated, by decreasing the magnification of said second image if said area has a width which exceeds a predetermined standard, and increasing the magnification of said second image if said area has a width which is less then said predetermined standard; and, identifying said unknown object as a particular object if a correlation between said third image and an image of said particular object exceeds a threshold.

2. A method according to claim 1 wherein said scaling operation is of the form $P2=V_{SD}(P1-V_A)$, where P1 is the magnitude of a pixel in the first image; P2 is the magnitude of a scaled pixel in the second image which corresponds to the pixel P1; $V_{SD}$ is a parameter greater than one; and $V_A$ is a parameter greater or equal to zero.

3. A method according to claim 2 and further including the steps of measuring the standard deviation of the pixels in said first image, and increasing the parameter $V_{SD}$ as the measured standard deviation decreases.

4. A method according to claim 2 and further including the steps of measuring the average value of the pixels in said first image, and increasing the parameter $V_A$ as the measured average value increases.

5. A method according to claim 2 and further including the step of storing control signals in a memory which represent particular values of said parameters for use in identifying said particular object.

6. A method according to claim 2 wherein said parameters $V_{SD}$ and $V_A$ are predetermined and independent of said pixels in said first image.

7. A method according to claim 1 wherein said scaling operation is of the form $P2=V_{SD}P1$, where P1 is the magnitude of a pixel in the first image; P2 is the magnitude of a scaled pixel in the second image which corresponds to the pixel P1; and $V_{SD}$ is a parameter greater than one.

8. A method according to claim 1 wherein said scaling operation is of the form $P2=V_{SD}P1-V_A$, where P1 is the magnitude of a pixel in the first image; P2 is the magnitude of a scaled pixel in the second image which corresponds to the pixel P1; $V_{SD}$ is a parameter greater than one; and $V_A$ is a parameter greater or equal to zero.

9. A method according to claim 1 wherein said unknown object is the face of a person who is to be identified.

10. A method according to claim 1 wherein said camera generates said first image in the infrared frequency spectrum.

11. A method according to claim 1 wherein said camera generates said first image in the visible light frequency spectrum.

* * * * *